Patented Dec. 14, 1937

2,102,130

UNITED STATES PATENT OFFICE 2,102,130

OIL-SOLUBLE PHENOLIC RESIN AND PROCESS OF MAKING SAME

John B. Rust, Orange, N. J., assignor to Ellis-Foster Company, a corporation of New Jersey No Drawing. Application May 24, 1935,
Serial No. 23,257

4 Claims. (Cl. 260—4)

This invention relates to oil-soluble synthetic resins and the process of making same, having as its aim the solubilizing of simple phenol-formaldehyde resins of the permanently fusible variety with drying oils to yield useful materials for the formulation of varnishes.

It is known that resins formed by condensing phenol or cresol with formaldehyde in the presence of an acid catalyst, such as oxalic, acetic, hydrochloric and phosphoric acids, are fusible and furthermore if the proportion of formaldehyde is maintained at less than 1 mole to 1 mole of the phenol, permanently fusible resins result. It is also known that the latter resins are insoluble in drying oils when treated in the usual manner of varnish making.

This invention proposes to solubilize the latter resins by treatment of the resins with a modicum of drying oil. Furthermore the process is accomplished without the use of deleterious agents or fluxes, excessively high temperatures, or inordinately long heating periods.

In general my method is to heat the permanently fusible phenol resin to about 260° C. and add a modicum of drying oil in small increments. When the first addition takes place, the resin melt becomes cloudy, slowly clearing as heating progresses. The time when the next increment may be added is determined when a sample drop of the melt solidifies at room temperature to a clear bead. This addition is repeated until the entire amount of drying oil necessary to confer oil-solubility upon the phenol resin has been introduced. The amount of drying oil necessary to produce this effect varies with the type of oil and the type of resin used, but is preferably kept at a minimum if hard, friable resins are desired. By this method resins ranging from brittle solids to viscous liquids may be prepared depending upon the amount of drying oil used to confer solubility. Usually there is a very definite amount of a given drying oil which confers requisite oil-solubility upon a given phenol resin, above which amount more drying oil may be added without conferring additional solubility and below which amount it is impossible to go and yet retain ready miscibility with drying oils.

I have found that a phenol resin with difficulty absorbs the first increment of drying oil when it is added to the molten resin. However, after this initial amount has been absorbed increasingly larger increments may be blended without undue cloudiness or precipitation occurring in the melt. Phenolic resins prepared by condensing phenol or cresol with formaldehyde in the presence of an acid catalyst are not soluble in drying oils as was stated above. However, I have found that drying oils are slightly soluble in the molten resins and that when a phenol resin has taken up a small amount of oil the resin is so modified that it has a greater solvent power for the oil and can dissolve more oil in a shorter time at a given temperature with each successive addition. This discovery leads to the solubilizing method stated above. The process is one in which the solvent power of the phenolic resin for drying oils is increased to such a point that it can subsequently be dissolved in an unlimited amount of oil.

Since the resin must be melted and become liquid at the temperature of addition of the solubilizing oil, it is necessary to use a fusible resin obtained by acid condensation of a phenol and formaldehyde. Furthermore, since the melting process requires in general some time, the resin must not be of the thermo-setting type, that is, less than 1 mole of formaldehyde must be used to each mole of the phenol. However, a variation of the above procedure comprises the formation of a solubilized phenol resin which is used as a flux for a thermo-setting variety of phenolic resin. For instance, a permanently fusible cresol-formaldehyde resin is solubilized by treating it with a modicum of a drying oil. This solubilized resin is then ground with a thermo-setting cresol-formaldehyde resin and the mass heated rapidly to 270° C. A clear fusible resin results.

Phenolic resins which have been solubilized by the methods of the present invention are readily soluble in drying oils and may be used in the production of varnish bases, impregnants for oiled cloth, as linoleum substitutes or as enamels, lacquers and paints. They may be used in electrical insulation, molded products, baked coatings, adhesives, and floor tiles.

Semi-drying and non-drying oils may be used to replace part or all of the solubilizing drying oil. For instance, mixtures of castor and tung oil, linseed and stearin, soy bean and cottonseed oil or castor oil, cottonseed oil, fish oils, and olein may be used instead of a drying oil. Modified drying oils such as blown, boiled or catalytically bodied oils are of use. Non-fatty oils, such as cashew nut shell oil which is stated to be of a phenolic character, confer excellent solubility upon phenolic resins. The modified oil called β-tung oil, which is a solid modification of tung obtained, for example, by treating tung oil with iodine in the presence of ultraviolet light, is a potent solubilizer for phenol resins. Of all the solubilizing oils, however, I have found that the more unsaturated drying oils such as tung oil, β-tung oil, bodied and blown tung oil, linseed oil, oiticica oil, and so forth, are best. These oils confer oil-solubility upon phenolic resins when used in small amounts and require lower temperatures and shorter heating periods. This fact is true mainly because they are more soluble in phenol resins than other oils.

The following are examples illustrating more specifically the procedure given above. All proportions are parts by weight.

Resin A.—200 parts USP carbolic acid
100 parts 37% aqueous formalin solution
8 parts oxalic acid The materials were mixed and heated until a well defined water layer appeared, then heating under reflux condenser was continued for about ¼ hour longer. The viscous resinous material was dehydrated giving a hard, brittle, fusible resin.

Resin B.—200 parts mixed meta-para-cresols
100 parts 37% aqueous formalin solution
15 parts acetic acid The materials were mixed and heated under reflux conditions until a well defined water layer appeared. The heating was continued for about 20 minutes longer. The resulting viscous mass was dehydrated yielding a hard, brittle, fusible resin.

Resin C.—200 parts mixed xylenols
150 parts 37% aqueous formalin solution
7 parts oxalic acid The materials were mixed and heated under reflux conditions until a well defined water layer appeared. The heating was continued for about ¼ hour longer. The resulting viscous mass was dehydrated yielding a fusible, hard, brittle resin.

*Example 1.*—Two parts of resin A were mixed with ¼ part of tung oil and heated to 270° C. The temperature was held at 270° C. for about 5 minutes until a sample drop of the melt formed a clear bead on cooling to room temperature. The next increment of ¼ part of tung oil was added and heating continued at 270° C. until a sample drop formed a clear bead. The procedure was repeated twice more with ¼ part of tung oil until a clear melt resulted containing in all 2 parts of resin A to 1 part of tung oil. This resin when cooled to room temperature was hard, brittle, light-colored and readily soluble in tung oil to form a varnish.

For instance, 1 part of the latter resin was heated with 2 parts of tung oil to 250°–260° C. and held at this temperature until the mixture became clear and well bodied. The varnish base was cooled to room temperature and thinned with an equal weight of V M and P naphtha. One per cent lead-cobalt naphthenate drier was added, giving a varnish which dried dust-free in about 1 hour and was entirely dry in 3 to 3½ hours.

The varnish was unaffected by water or acids and had excellent resistance to alkalies. A wooden panel brushed with two coats of the varnish and exposed continuously to the weather for one year showed no deterioration and had retained the same gloss as when freshly applied.

*Example 2.*—Two parts of resin B were heated with ⅓ part of tung oil to 200° C. and the temperature held at this point for about 10 minutes until a sample drop of the melt remained clear on cooling. ⅓ part of tung oil was added, keeping the temperature at 200° C. and heating continued for 5 minutes when a last ⅓ part of the tung oil was added and heating at 200° C. continued for 10 minutes longer. The resin which resulted was hard and brittle at room temperature, light colored and immediately soluble in tung oil at 210° C.

A varnish made from the latter resin and tung oil, using the same proportions as in Example 1, had the same durability and gloss as the solubilized phenol-formaldehyde varnish.

*Example 3.*—Two parts of resin C were mixed with ¼ part of raw linseed oil and heated to 280° C. for about 5 minutes until a sample drop on cooling formed a clear bead. Three more additions of ¼ part of linseed oil were made, holding the temperature at 280° C. and allowing the melt to be heated for 5 minutes before the next addition. The resulting mass when cooled to room temperature was a hard, brittle, light-colored resin readily soluble in linseed oil.

A varnish made from this resin and linseed oil, containing lead and cobalt driers, dried hard in less than 24 hours. A wooden panel of such a varnish was placed on an exposure rack at 40° north latitude for one year. The coating had not been weathered during this time, and in appearance was the same as when freshly applied.

*Example 4.*—Two parts of resin B were mixed with ¼ part of raw linseed oil and heated to 280° C. for about 10 minutes until a sample drop when cooled to room temperature yielded a clear bead. ¼ part linseed oil was then added and the temperature maintained at 280° C. for 7 minutes. Two more additions of ¼ part of linseed oil were made, heating at 280° C. for 5 minutes after each addition.

This latter resin at room temperature was light colored, hard and brittle. It was readily soluble in tung oil when heated with the oil at 250°–260° C.

*Example 5.*—Five parts of resin A were mixed with 1 part of blown tung oil (prepared by blowing air through tung oil heated to 150°–200° C. until substantially thickened) and heated to 260°–270° C. until a sample drop of the melt yielded a clear bead when cooled. Two more additions of 1 part of blown tung oil were made, heating being continued after each addition until a clear bead was formed on cooling.

The resulting resin was light colored, hard and brittle.

I have also found that the soft infusible gels derived by heating drying oils are also soluble in phenol resins and that they confer solubility upon the resins in the same manner as the drying oils themselves. For instance, a soft, rubbery gel made by heating linseed oil at 300° C. may be used in the place of the raw linseed oil in Example 4. The soft gel made by heating tung oil to 270° C. until it shows signs of gelling then cooling rapidly to room temperature may be used in Examples 1 and 2 to replace the tung oil. The soft gel made by heating blown tung oil to 200° C. until it shows signs of gelling then cooling rapidly to room temperature may be used in place of the blown tung oil of Example 5.

As stated above, the more unsaturated oils solubilize phenolic resins with greater ease than do the less unsaturated oils. The next example is illustrative of this.

*Example 6.*—Twenty parts of resin B were heated to 270° C. with 3 parts of crude cottonseed oil and 3 parts of raw tung oil, respectively. The batch containing the tung oil required 5 minutes to become clear while that containing the cottonseed oil required 20 minutes. A second increment of 3 parts respectively of cottonseed and tung oils was added to the separate batches. At 270° C. this increment of the tung oil required 5 minutes to dissolve, while 15 minutes were required for the cottonseed oil. A third increment of 4 parts respectively of cottonseed and tung oils was added. At 270° C. these increments required for the cottonseed oil 10 minutes to dissolve, for the tung oil 3 minutes to dissolve. At the end of the operation the tung oil-solubilized resin was somewhat lighter in color than the cottonseed oil-solubilized resin and the former was somewhat more readily soluble in tung oil than the latter.

Non-fatty oils such as cashew nut shell oil are excellent solubilizers for the simple phenol resins and furthermore the latter are better solvents for this type of oil than for the glyceride type.

*Example 7.*—50 parts resin B
15 parts crude cashew nut shell oil

Heated together to 250° C. The resin dissolved the oil with ease, accompanied by foaming and elimination of water. The result was a brown, hard, brittle resin very readily soluble in tung and linseed oils.

*Example 8.*—2 parts resin B
1 part cod liver oil

The resin was heated to 280° C. with a primary increment of ¼ part of cod liver oil and held at this temperature until a sample drop formed a clear bead at room temperature. The remainder of the oil was added in ¼ part increments, maintaining the temperature at 200° C.

The resulting resinous mass was hard and friable.

I have found that the lower the melting point of the fusible resin used the more readily is it solubilized by the solubilizing oil. However, all fusible phenolic resins which are normally insoluble in vegetable oils may be solubilized by the above methods.

The simple phenol resins are not the only resins which can be solubilized, but also those derived from other phenols such as diphenylolpropane-formaldehyde resin and dicresylolpropane-formaldehyde resin, the diphenylolpropane and dicresylolpropane being prepared by condensing phenol or cresol with acetone. These resins are normally insoluble in excess drying oils by the usual methods of varnish making, but may readily be solubilized by the aforementioned methods. Furthermore, crude mixtures of phenols may be used to form the fusible resin in the same way as the pure compounds. These resins solubilize easily and give excellent, inexpensive oil-soluble materials.

Among the drying oils which may be used are tung, oiticica, linseed, perilla, soy bean oils, and fish oils; the non- or semi-drying oils, cottonseed, sperm, cod liver, corn and jojoba; the non-fatty oil, cashew nut shell oil.

As stated above, the drying oils are the best solubilizers probably because of their unsaturated character. The solubilization process is probably one of chemical reaction producing a modified resin. The solubilization depends upon the solubility of the oil in the phenolic resin and I have found that the solubilizing effect of a given oil is a direct function of its solubility in a phenolic resin and furthermore the solubility seems to be a direct function of the number of double bonds in the glyceride oil.

This invention provides a method of producing oil-soluble phenolic resins from relatively cheap phenolic bodies without the use of agents which detract from the excellent varnish properties of the resins and their chemical and corrosion resistance are not lessened through the addition of adulterants.

The resins obtained by this invention when solubilized with a modicum of drying oil, cannot as such be used with thinners and driers to yield an air-drying varnish, but preferably must first be cooked with a larger quantity of drying oil to give the varnish base the requisite flexibility, toughness and adhesion. Although when solubilizing a phenol resin more than the necessary amount of solubilizing oil may be added so as to yield, in effect, a short oil varnish base, this invention is mainly concerned with the production of fusible, friable resins which are soluble in large quantities of drying oils to form varnishes.

One phase of the invention, therefore, is that of the production of a fairly hard, even brittle resin soluble in glyceride oils, particularly drying oils. By solubilizing the phenolic resinous material with a modicum of such glyceride oil I avoid conversion of the mass into a gummy, sticky or fluent material. A resin which therefore may be termed hard or dry results which in its preferred form does not fuse together when fragments are assembled in bulk, at least such fusion does not occur under ordinary temperate climate conditions, which enables such a resin to be handled and shipped readily. Ordinarily phenolic resins which have been solubilized with drying oils are brought to a consistency of varnishes by treatment with solvents and the like, whereas by proceeding according to the preferred form of my present invention I may form a phenolic resin from a simple lower phenol, such as $C_6H_5OH$, or one of the three cresols, or mixtures of any of these, by incorporation with a modicum of a drying oil adequate to solubilize but not sufficient to make a fluent product. The invention would, therefore, appear to typify that class of substances which will not dissolve in a given solvent but, nevertheless, that solvent will dissolve in the substance.

Although the specification has set forth particularly formaldehyde as the illustrative aldehyde, I may use various other aldehydes, such as acetaldehyde, and the like, or mixtures of these with formaldehyde. Preferably, however, I employ the lowest aldehyde and the lowest phenol or its next higher homologue in the production of a resin of the fusible type and solubilize this resin in glyceride oils, specifically drying oils, by heating the normally-insoluble phenolic resin with a proportion of oil substantially lower than the resin so as to give a major or predominating proportion of resin in the ultimate composition or mixture, whereby I am able to prepare resinous masses which do not adhere from stickiness but which will remain in fragmental or lump form indefinitely without substantial change in shape during storage, such material being, however, readily soluble in a drying oil when heated therewith. For example, a cresol resin normally insoluble in tung oil but modified by heating with a modicum of tung oil to produce solubility was made up as a brittle or hard resinous material and fragments of this stock have been kept in glass containers for over a year without sticking together or coalescing to a gummy intractable mass.

It is understood that compositions made up from the foregoing synthetic product may be pigmented with various dyes or colors, particularly shades of yellow, brown, blue, and darker colors generally. Paints made up of this kind, that is, from the oil-solubilized resin, a drying oil and a thinning agent such as a volatile hydrocarbon either of the aromatic or aliphatic series or mixtures of these, may be used advantageously for protecting exposed metal structures as, for example, oil tanks, and the like.

To recapitulate, the preferred form of the invention comprises a fragmental product containing or consisting of a phenolic resin complex with an oil-solubilizing modicum of an oil, preferably a glyceride oil. Preferably, also, the resin itself has as its basis a phenol of the lower phenol type, e. g., phenol, cresol or xylenol or mixtures of these, reacted with a lower aldehyde, such as formaldehyde or acetaldehyde, to form the initial resin basis which in turn is solubilized by bringing a modicum of an oil, preferably of the glyceride type, into solution or reaction with the phenolic resin basis. Thereupon to make a varnish or paint the solubilized resin or resin complex is incorporated with a drying oil and thinned with mineral spirit or other hydrocarbon thinner and the like.

The following is another example of that particular phase of the invention involving the making of a fragmental product or equivalent product comprising essentially a phenolic resin complex with an oil-solubilizing proportion or modicum of a glyceride oil. Although proportions may be varied considerably over those disclosed by way of illustration, I prefer in most cases to have the normally-insoluble phenolic resin present in major proportion and the solubilizer present in minor proportion to yield a complex which prepared in fragmental form offers the advantages in handling weighing and so forth characterizing discrete masses of a fragmental nature.

*Example 9.*—30 parts of resin B were fused, the temperature being taken to 150° C. 2 parts of an equal mixture of perilla and tung oils were added and the temperature raised to 270° C. When the temperature reached this value a clear melt resulted, but 3 minutes of heating were required to yield a clear bead on cooling a sample drop to room temperature. After a clear bead resulted, 6 more increments of the perilla and tung oil mixture were added over a period of 10 minutes and the melt heated for 7 additional minutes at 270° C. The total heating treatment was therefore approximately 20 minutes for this batch, giving a melt consisting of 30 parts resin B, 7.5 parts perilla oil and 7.5 parts tung oil. At room temperature the resin was hard and brittle, could be easily broken into fragments of a light brown color and was soluble in tung oil at 260° C. The softening point of the resin was 83° C. and a 50 per cent solution in xylene would permit only the addition of 5 per cent V M and P naphtha before precipitation of the resin occurred. However, a varnish base made with 1 part of the above resin and 1.7 parts of tung oil cooked at 260°–270° C. for 14 minutes could be thinned in any proportion with V M and P naphtha or analogous petroleum spirit.

The examples given herein illustrate procedures in which the solubilizing oil is added in separate increments to the fused resin. This should not be construed as limiting, since various modifications may be employed as, for instance, adding the oil to the resin melt slowly in a thin stream so that the oil dissolves in the resin without cloudiness occurring. Thus the amount of oil may be easily controlled and solubilization achieved in a short time. Furthermore, addition of the oil may be continued beyond the point where solubilization takes place and up to such points where varnish stocks result which merely with the addition of solvents and driers yield drying varnishes. For instance, a fusible cresol-formaldehyde resin is melted at 270° C. and tung oil added to the melt in a thin stream slowly over a period until the amount of tung oil is twice the amount of resin, giving approximately a 25 gallon varnish. In this case the stream of oil preferably is controlled so that a clear melt is obtained at all times, otherwise the oil will precipitate from the resin and can be redissolved only upon prolonged heating with consequent deterioration of color. The feature of light-color maintenance is of prime importance in the production of varnishes.

What I claim is:

1. The process of rendering an acid condensed permanently fusible phenolic-aldehyde normally oil-insoluble resin soluble in drying oil, which consists in heating said resin with successive portions of glyceride oil in the absence of other fluxing agents, the procedure being to heat the resin with the first portion of oil until a small sample withdrawn from the mixture cools to a clear bead, then adding another portion of oil to the resin and continuing the heating until a second small sample withdrawn from the mixture cools to a clear bead, and continuing this procedure until the minimum quantity of oil necessary to confer oil solubility of the resin has been incorporated in the resin, the thus oil solubilized resin being hard, brittle and light colored.

2. The process of rendering an acid condensed permanently fusible phenolic-aldehyde normally oil-insoluble resin soluble in drying oil which consists in heating said resin with successive portions of glyceride oil in the absence of other fluxing agents, the procedure being to heat the resin with the first portion of oil until a small sample withdrawn from the mixture cools to a clear bead, then adding another portion of oil to the resin and continuing the heating until a second small sample withdrawn from the mixture cools to a clear bead, and continuing this procedure until the minimum quantity of oil necessary to confer oil solubility of the resin has been incorporated in the resin.

3. The oil-soluble resin produced by the process of claim 1.

4. The oil-soluble resin produced by the process of claim 2.

JOHN B. RUST.